(12) United States Patent
Desgagné et al.

(10) Patent No.: US 6,175,734 B1
(45) Date of Patent: Jan. 16, 2001

(54) METHOD FOR ACQUISITION OF CELL RELATIONS IN A CELLULAR RADIOCOMMUNICATION SYSTEM

(75) Inventors: Michel Desgagné; Angelo Cuffaro; Pat Minichiello; Mohammed Sammour, all of Quebec (CA)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 09/162,122

(22) Filed: Sep. 29, 1998

(51) Int. Cl.$^7$ .............................. H04Q 7/20; H04B 17/00
(52) U.S. Cl. .................. 455/437; 455/424; 455/67.1; 455/67.3; 455/63
(58) Field of Search ......................... 455/423, 424, 455/446, 447, 67.1, 67.3, 67.6, 437, 438, 439, 422, 62, 63, 436, 226.2

(56) References Cited

FOREIGN PATENT DOCUMENTS 2 311 912   10/1997   (GB).
9827763   6/1998   (WO).

*Primary Examiner*—Nay Maung
*Assistant Examiner*—Erika A. Gary
(74) *Attorney, Agent, or Firm*—Burns, Doane, Swecker & Mathis, L.L.P.

(57) ABSTRACT

A cellular communication system and method for determining cell relations between cells is disclosed. The cellular communication system transmits signals from one or more transmitters, for example, mobile stations or base stations, over a plurality of radio frequency channels that are assigned to the cells. The transmitted signals over the plurality of radio frequency channels are received at each one of the cells and their received signal strengths are measured at corresponding measurement times. The received signal strength measurements and corresponding measurement times are processed to determine whether a measured received signal strength at a corresponding measurement time is based on a transmission from a single transmitter in a cell. The measurements corresponding to signals found originated from single transmitters are used for determining the cell relations in terms of such parameters as path gain values or C/I ratios.

20 Claims, 5 Drawing Sheets

Freq. Priority In BS 7

|    | TS0 | TS1 | TS2 | TS3 | TS4 | TS5 | TS6 | TS7 |
|----|-----|-----|-----|-----|-----|-----|-----|-----|
| $f_1$ |     |     |     |     |     |     |     |     |
| $f_2$ |     |     |     |     |     |     |     |     |
| $f_3$ |     |     |     |     |     |     |     |     |

List 1

FIG. 3a

Freq. Priority In BS 1 - BS 6, BS 8

|    | TS0 | TS1 | TS2 | TS3 | TS4 | TS5 | TS6 | TS7 |
|----|-----|-----|-----|-----|-----|-----|-----|-----|
| $f_3$ |     |     |     |     |     |     |     |     |
| $f_2$ |     |     |     |     |     |     |     |     |
| $f_1$ |     |     |     |     |     |     |     |     |

List 2

FIG. 3b

METHOD FOR ACQUISITION OF CELL RELATIONS IN A CELLULAR RADIOCOMMUNICATION SYSTEM

FIELD OF THE INVENTION

The present invention generally relates to radiocommunication systems, and more particularly to a method and system for measuring cell relations in a cellular communication system.

BACKGROUND OF THE INVENTION

Generally, in a cellular radiocommunication system, a coverage area is divided into smaller sub-areas known as cells, where each cell is assigned a set of radio resources for serving subscribers. In a FDMA (Frequency Division Multiple Access) cellular system, the radio resources comprise multiplexed radio frequency channels. In a TDMA system (Time Division Multiple Access), the information is transmitted during assigned time slots of a set of radio frequency channels, with different users being assigned corresponding time slots on the same or different radio frequency channels. In both the FDMA and TDMA cellular systems, however, the assignment of the radio frequency channels between the cells produces two types of interference: co-channel interference and adjacent channel interference. Co-channel interference results if two separate signals are sent on the same frequency simultaneously, thereby limiting the ability of a receiver receiving both signals to separate them for detection of the desired signal. Adjacent channel interference results if channels that are adjacent to each other in the frequency spectrum are used in the same geographical area. Transmissions on a radio frequency channel tend to leak to adjacent frequencies and cause interference.

Conventionally, co-channel interference and adjacent channel interference in cellular systems are reduced by intelligently dividing the radio frequency resources among the cells. Most cellular systems use a predefined frequency re-use pattern that is optimized based on a particular characteristic of a coverage area. Under such frequency re-use pattern, adjacent cells are assigned different radio frequency channels, with the same radio frequency channel assignment being repeated for distant cells. Because some of the radio frequency channels are re-used in distant cells, co-channel interference can not be totally eliminated.

Improved frequency planning that relies on cell relations can further reduce co-channel. The cell relations among the cells is often expressed by statistically estimating measured cell relation parameters. Known methods for estimating cell relations have focused on measuring overall interference in a certain cell. Such measurements are usually done, while ordinary communication traffic is in progress. Under such circumstances, it is often difficult to identify the source of a signal for measurement purposes, since the radio frequency channel over which measurements are made may include contributions from several sources. It is thus difficult to accurately measure how much transmissions in one cell interferes with transmissions in another cell, if such transmissions occurs simultaneously on the same frequency. As a result, conventional methods do not provide an accurate representation of cell relations among the cells.

It is, therefore, desirable to accurately measure cell relations, preferably, in both the up-link direction and down-link direction, without interfering with ongoing traffic.

SUMMARY OF THE INVENTION

Briefly, according to the present invention, the method for determining cell relations in a cellular communication system transmits signals from one or more transmitters over a plurality of radio frequency channels that are assigned to the cells. The transmitted signals over the plurality of radio frequency channels are received at each one of the cells and their received signal strengths are measured at corresponding measurement times. The received signal strength measurements and corresponding measurement times are processed to determine whether a measured received signal strength at a corresponding measurement time is based on a transmission from a single transmitter in a cell. In the exemplary embodiment of the invention, the determination of whether a measured received signal strength is from a single transmitter in a cell is based on a record of ongoing calls within the communication system. Based on received signal strength measurements that are determined to be from single transmitters, cell relation values between the cells are determined, either in terms of path gain values or C/I ratios.

According to some of the more detailed features of the present invention, the received signal strength measurements correspond to uplink received signal strength measurements, where the one or more receivers are one or more base stations. Each base station has a call allocation list that prioritizes the radio frequency channels assigned to incoming calls within its cell. According to one feature of the invention, the call allocation lists in at least two of the base stations are arranged to increase the probability of measuring received signal strength from single transmitters. More specifically, the call allocation list in one base station prioritizes the radio frequency channels allocatable to the calls in a reverse order relative to the prioritization of the radio frequency channels allocatable to calls at the other base station.

According to yet other more detailed features of the present invention, the received signal strength measurements correspond to downlink received signal strength measurements, with the one or more receivers being one or more mobile stations. Each base station incorporates a list that prioritizes the radio frequency channels over which received signal strength from a base station is measured. In the exemplary embodiment, the list of the plurality of radio frequency channels used for received signal strength measurements at the mobile stations is included as a part of a MAHO list transmitted to the mobile stations at the beginning of a call.

BRIEF DESCRIPTION OF THE DRAWINGS

FIGS. 3(a) and 3(b) are diagrams of radio frequency channel lists assigned to some of the base stations of the system of FIG. 1.

DETAILED DESCRIPTION

The present invention will be described with respect to a Time Division Multiple Access Scheme (TDMA) cellular mobile communication system, such as one operating under the TIA standard IS-136, also known as D-AMPS standard.

It should be understood, however, that the invention could be considered for other types of cellular systems as well, including those operating under a CDMA or FDMA standard, as well as systems using packet switched or circuit switched protocols.

Figure 1:
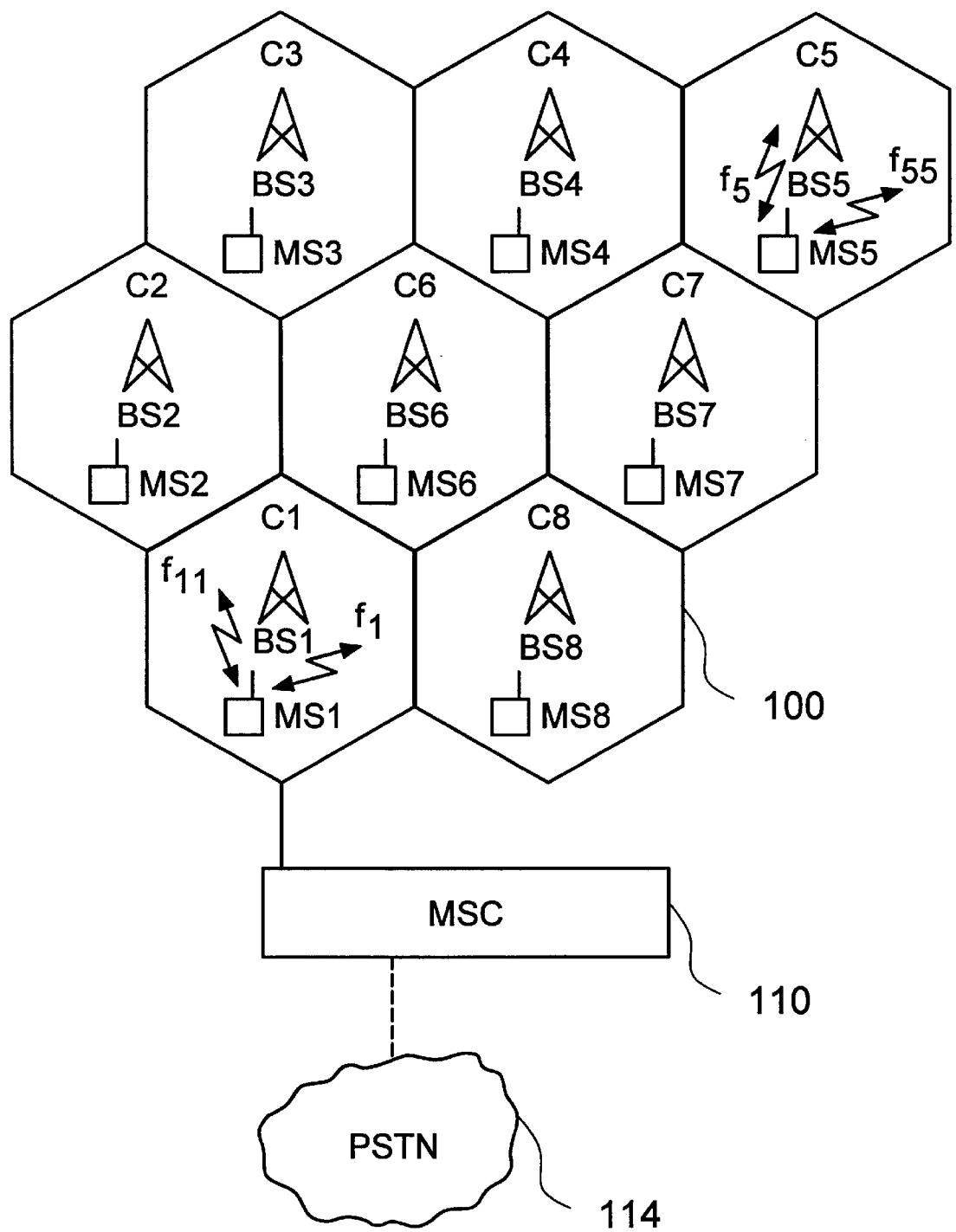
FIG. 1 is a block diagram of a cellular communication system that advantageously incorporates the cell relation determination method of the present invention.

FIG. 1 shows a block diagram of an exemplary cellular communication system 1 that serves a cellular coverage area 100. The cellular coverage area is divided into a number of cells designated as C1—C1 within which mobile stations MS1–MS8 are served. The communication system 1 includes a Mobile Switching Center (MSC) 110 that provides central control over communication activity within the coverage area 100. Preferably, the MSC 110 is connected to a PSTN 114 for providing wireless communication among the mobile stations MS1–MS8 and PSTN subscribers. The wireless communication capability is provided through radio links established by a number of base station BS1–BS8, which serve a corresponding one of the cells C1—C1.

Operationally, the base stations BS1–BS8 transmit downlink information to the mobile stations on designated downlink radio frequency channels and receive uplink information from the mobile stations on designated uplink radio frequency channels. Similarly, the mobile stations MS1–MS8 receive the downlink information on the downlink radio frequency channels and transmit the uplink information on the uplink radio frequency channels. As described before, the transmitted information on uplink or downlink directions may be received, not only by an intended receiver within the cell of a transmitting source, but also by non-intended receivers that are located within the communication system 1. For example, upon transmission of downlink information to MS1 from BS1 over a cell C1 assigned radio frequency channel $f_1$, another mobile station MS5 in cell C5 may also receive the BS1 transmitted downlink information, if cell C5 is assigned the same downlink frequency $f_1$, causing co-channel interference. Similar co-channel interference may be caused at the base stations by uplink transmissions from the mobile stations over the same uplink radio frequency channel. For example, as shown in FIG. 1, the base station BS5 in cell C5 may receive uplink information on frequency $f_{11}$, which is the uplink radio frequency channel used for transmission of uplink information in cell C1. Again, if cell C1 and cell C5 are assigned the same uplink radio frequency channel $f_{11}$, simultaneous uplink transmissions at these cells may cause interference at the corresponding base stations. For efficient frequency planning purpose, it is therefore necessary to determine the downlink and uplink cell relations for each cell relative to all other cells in terms of such parameters as path gain values or carrier to interference (C/I) ratios.

In order to accurately determine the uplink and downlink cell relations among the cells, it is important to measure received signal strength from a single transmission source within a cell, otherwise cell relations acquired would be affected by transmissions from several cells, thereby causing less reliable measurements. According to one aspect of the present invention, each one of the base stations BS1–BS8 measures received signal strength over a number of radio frequency channels at a predefined rate, e.g., 50 radio frequency channels per second. In the TDMA arrangement, each base station scans the radio frequency channel, for example, via a scanning receiver, and measure the received signal strengths over a predetermined number of time slots. In a CDMA or FDMA implementation, the base station may scan the radio frequency channels and measure received signal strengths over each radio frequency channel during predefined time intervals. Therefore, the base stations BS1–BS8 continuously report to the MSC 110 the measured received signal strengths over each one of the radio frequency channels along with a corresponding measurement time.

The MSC 110, which is aware of all communication activity within the coverage area 100, maintains a record of all ongoing calls within the cells C1–C8, including a record of radio frequency channels allocated to each one of calls at any particular time. Based on the call record and the reported information from the base stations, the MSC determines which one of the received signal strength measurements corresponds to a measurement from a single transmission source within a cell. More specifically, the MSC 110 determines whether at a particular measurement time, the measured radio frequency channel was assigned to a call in a single cell or to calls in multiple cells, for example, in cells that re-use the measured radio frequency channel. If a measured radio frequency channel is assigned to a single cell at the measurement time, the corresponding signal strength measurement at the base station is selected and stored in the MSC 110 as a parameter for determining the cell relations among the cells. Otherwise, if at the measurement time, the measured radio frequency channel was simultaneously used in two or more cells, the corresponding signal strength measurement is discarded, because it potentially represents contributions from multiple transmission sources. Therefore, for uplink cell relation calculations, the present invention uses received signal strength measurements over those radio frequency channels that are found to be used for originating uplink transmissions from a single transmitter.

In order to express cell relations in terms of path gain values, it is necessary to determine the factor by which an uplink or downlink transmitted signal is attenuated before it is received. Such factor is determined based on a received signal strength at the receiver and the transmit power level at the transmitter. In the exemplary communication system 1, the base stations BS1–BS8 are equipped to instruct the mobile stations positioned within their corresponding cells to increment and decrement their power level in a well known manner. Such increment or decrement of mobile stations' power levels, which are based on a received signal strength form the mobile stations, is relative to a reference power level provided by the MSC 110. Therefore, the MSC 110 may determine path gain values based on transmit power level information at the mobile stations, when received signal strengths are measured at the base stations.

In order to determine path gain values, the base stations BS1–BS8 continuously provide time stamped transmit power reports relating to the power output of the mobile stations MS1–MS8 at various times to the MSC. By time correlating the transmit power information and selected, i.e., un-discarded, received signal strength measurements stored in the MSC 110, path gain values may be calculated for expressing the cell relations between any two cells.

Figure 2A:
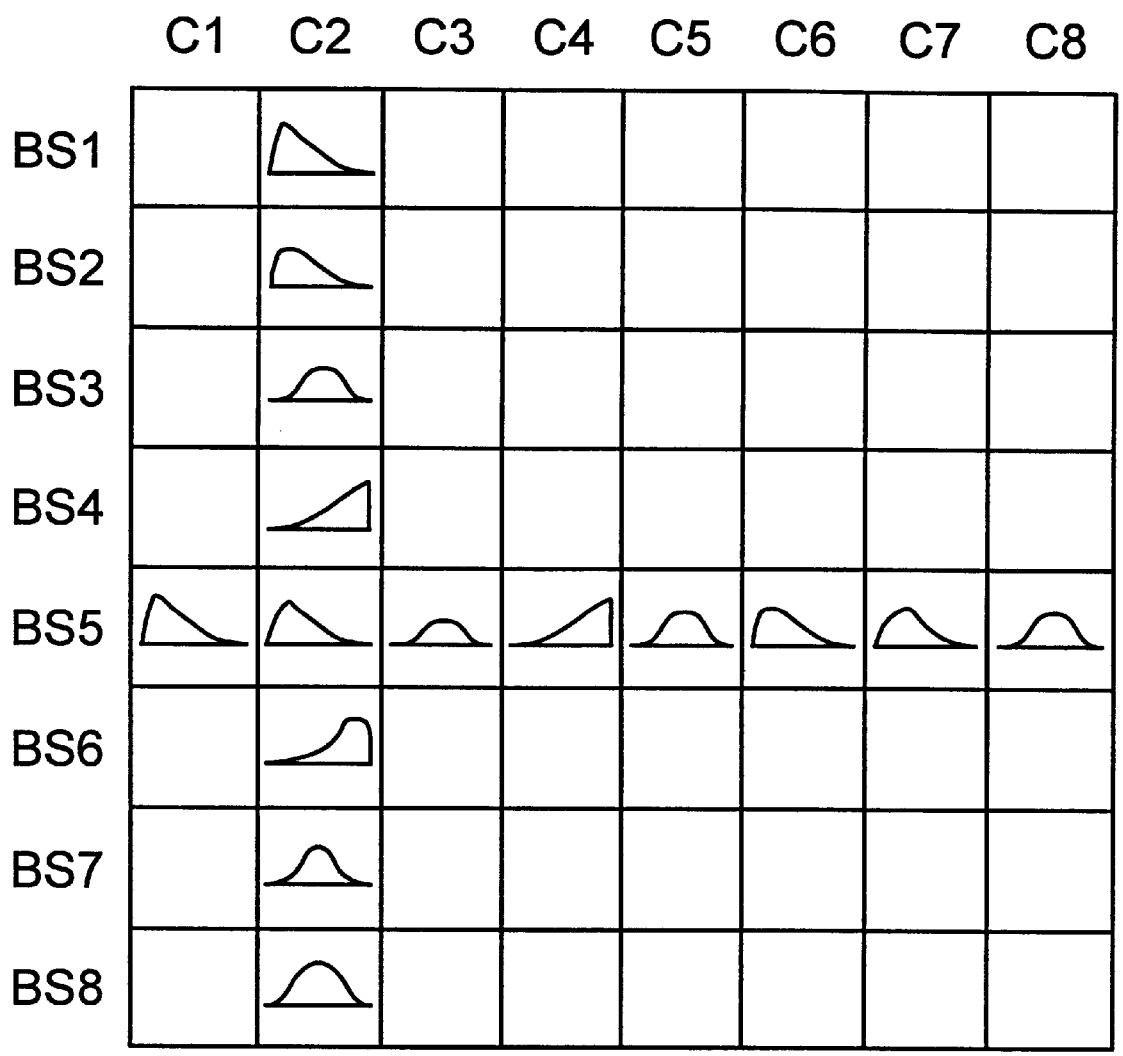
FIG. 2(a) is a diagram of a matrix representing the distribution of a cell relation parameter used in the method of the present invention.

Due to various factors, the values of measured cell relation parameter amongst the cells may vary significantly. Thus, a distribution function is used when considering the measured parameters that establish cell relations. As described before, the cell relations may be expressed in terms of path gain values or C/I. Furthermore, the cell relation values may be expressed in terms of PathgainC/PathgainI ratios. FIG. 2(a) shows the cell relations being represented in the MSC 110 by a matrix that includes different storage locations for each possible combination of cell pairs and their respective cell relation measurements. One dimension of the matrix corresponds to base stations BS1–BS8 in cells where received signal strength is measured, and the other matrix dimension corresponds to cells C1–C8 from which the received signals were transmitted. For example, by calculating path gain values based on continuous measurement of received signal strengths over the radio frequency channels, path gain distributions may be calculated for expressing relations between each pair of two cells according to corresponding histograms. The histograms, which are shown as curved graphs in some of the storage locations of the matrix, correspond to the distributions of path gain values between any two cells.

Figure 2B:
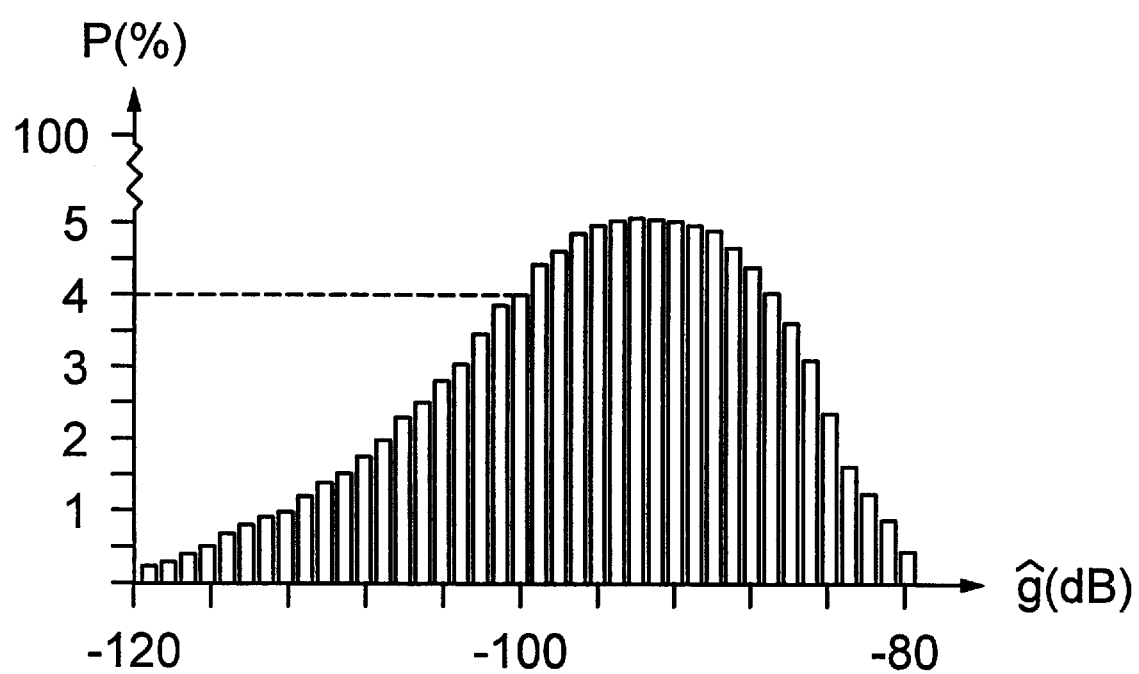
FIG. 2(b) is a diagram of a histogram representing an exemplary distribution of cell relation parameters.

FIG. 2(b) shows an exemplary histogram derived after the convergence of the distribution of the path gain values. The X-axis corresponds to the path gain values, which are expressed in dB, with the path gain assuming a value in the range of –120 dB and –80 dB. The Y-axis of the diagram shows the probability, in percentage, of a certain path gain value occurring between two cells. The histogram is represented by stacks of mutually different heights, with the combined height of the stacks corresponding to a 100% probability. The height of each stack illustrates the probability of a receiver receiving from a transmitter in a cell precisely a path gain corresponding to a received signal strength represented by the stack. Each stack has a width of 1 dB. For example, in the illustrated histogram, the probability of a corresponding base station in the matrix obtaining a path gain value of –100 dB for a signal received from a transmitter in a corresponding cell in the matrix is 4%.

The histogram is generated by accumulating the path gain values continuously and assigning such values a corresponding probability value. For example, when an amplification value representing –110 dB is sampled, the stack corresponding to this value is raised in the illustrated case by a predetermined parameter corresponding to 1/100th of a percent. The method proceeds until the total height of the stacks for the sampled values reach 100%. When the combined height of the stacks has reached 100%, the histogram is normalized as the values are collected. After sampling a path gain value, the stack that represents this value is raised by the predetermined parameter, i.e. by 1/100th of a percent. All stacks are then lowered proportionally, such as to lower the combined height of the stacks by 1/100th of a percent. This process continues until the distribution of path gain values for each pair of cells converges and becomes stable. One conceivable alternative to the illustrated method of generating a histogram is to have a start distribution already at the beginning of the start-up phase and to normalize the histogram already at this point. As mentioned above, other cell relation measurement, for example, those based on C/I ratios, may be achieved in a manner similar to what has been described with respect to path gains values.

It would be appreciated that in the above described embodiment, the cell relation parameters are derived on an accidental basis. This is because the allocation of radio frequency channels for calls occurs at random, with the probability of selecting or discarding a received signal strength measurement being accidental. Consequently, the amount of time needed for providing a converged distribution of cell relation parameters may become very long. According to another embodiment of the invention, the convergence time of the distribution is shortened by controlling the allocation of radio frequency channels to the calls. Under this embodiment, the MSC 110, which has control over the allocation of the radio frequency channels to the calls, allocates them such that the probability of selecting a received signal strength measurement from a single source is increased.

More specifically, one or more radio frequency channels used for calls in a cell of a cell cluster is given higher selection priority by being placed at the top of a call allocation list that prioritizes the radio frequency channels allocatable to calls for that cell. For the co-channel cells in any other cluster, the prioritized radio frequency channel is given a lower priority by being put at the bottom of the call allocation list thereby making it a less likely candidate for carrying a call. This arrangement thus allows the base stations to measure the signal strengths of the prioritized radio frequency channel in each cell of the chosen cluster and thus lower the chance of the measurement being discarded due to determination of simultaneous transmissions in other cells. In essence, the above method creates a unique "virtual" beacon in each cell of the chosen cluster. This method ensures that the radio channel frequency designated as the virtual beacon will be transmitting almost continuously. This method approaches the behaviour of a real beacon, and hence the term virtual. For example, in a 4/12 reuse cell plan, a cluster would have up to 12 unique and simultaneous "virtual" beacons.

FIGS. 3(a) and 3(b) show the exemplary call allocation lists, List 1 and List 2, of the radio frequency channel priorities given to the base stations BS7, and BS1–BS6, and BS8, respectively. BS7 is a base station that belongs to a cell that reuses the radio frequency channels of the cells within which the base stations BS1–BS6 and BS8 are positioned. According to the exemplary List 1 of FIG. 3(a), the radio frequency channel f1 is given higher priority of being assigned to incoming calls, thus a higher probability of transmitting on $f_1$, and radio frequency channel $f_3$ is given a lower priority for being assigned to incoming calls. On the other hand, according to List 2 of FIG. 3(b), the radio frequency channel $f_1$ is given a lower priority than the radio frequency $f_3$. By reversing the priority given to the radio frequency channels to two calls, the base stations are made to avoid allocation of the same frequency simultaneously, unless high call traffic requires the allocation of the same frequency to two different cells simultaneously. As such, this embodiment of the present invention provides a semi-accidental arrangement for determining the cell relations.

It is also desired to determine not only the uplink cell relations based on uplink received signal strength measurements, but also downlink cell relations based on downlink signal strength measurements. According to yet another embodiment of the invention, for downlink measurements, the mobile stations measure received signal strength on specified radio frequency channels by including the channels in a Mobile Assisted Hand-off list (MAHO-list), which is transmitted to the mobile stations at the beginning of a call. Conventionally, the MAHO list identifies radio frequency channels used by the base stations in neighboring cells. While a call is in progress, a mobile station periodically scans the radio frequency channels specified in the MAHO list to measure received signal strengths from neighboring base stations. In this way, a mobile station may determine a mobile assisted hand off is necessary or not. According to this embodiment of the invention, the MAHO list is modified to include a list of virtual beacons, as previously described for the uplink semi-accidental approach, over which the mobile stations periodically perform received signal strength measurements, not for hand off purpose, but for measuring downlink cell relation parameters. The downlink cell relation parameters so measured are reported from the mobile stations to the MSC for further processing.

Similar to the semi-accidental arrangement described above, the MAHO list transmitted to the mobile stations is arranged to prioritize the radio frequency channels in a manner that reduces the probability of simultaneous measurement of received signal strength over the same radio frequency channel from different cells. Assuming that cell C1, C3, and C5 give the highest priority to virtual beacons $f_1$, $f_3$, $f_5$, respectively, in one exemplary embodiment of the invention, the MAHO list of cell C4 would include the radio frequency channels $f_1$, $f_3$, $f_5$. In this way, by measuring the received signal strength over the radio frequency channels $f_1$, $f_3$, $f_5$ at the mobile stations within cell C4, downlink cell relations between cell C4 and each one of the cells C1, C3 and C5 may be determined. The radio frequency channels $f_1$, $f_3$, and $f_5$ are assigned the lowest priorities in any other cells of the communication system.

Using the above described method, the present invention may be adapted for determining downlink and uplink cell relations. In one embodiment, downlink signal strength measurements made at the mobile stations and the uplink signal strength measurement made at the base stations are measured simultaneously. In order to express downlink cell relations in terms of path gain values, the mobile stations MS1–MS8 continuously report to the MSC 110 time stamped measurements of interferences from radio frequency channels in the communication system, which as explained before are specified in the MAHO-list as virtual beacons. Also reported to the MSC are time stamped carrier signal strength measurement within the cell as well as transmit power output of the mobile stations BS1–BS8. By time correlating the transmit power information and selected interference measurements to remove collision, path gain values may be calculated for expressing the downlink cell relations between any two cells. As explained later in detail, the carrier signal strength measurements may be used to express the cell relations in terms of C/I ratios.

Thus, this embodiment of invention provides a hybrid approach that determines both uplink and downlink cell relations in a semi-accidental manner. Of course, the uplink and downlink measurements may be made separate and non-simultaneous from each other without departing from the scope of the present invention. When there is no traffic active in a cell, or if no new callers arrive, the MSC 110 may order a base station to transmit "dummy signal" of no meaning, such that signal strength measurements may be acquired in other cells within a certain geographical area, despite the fact that the radio frequency channels assigned to the cell are not used.

In order to define the uplink and downlink cell relations in terms of C/I ratios, four parameters must be determined. For expressing the uplink cell relations, it is necessary to determine an uplink carrier strength level (C) on an uplink radio frequency channel assigned to one cell as well as an uplink interference level (I) caused in another cell by a simultaneous uplink transmission on the same uplink radio frequency channel. Similarly, for expressing the downlink cell relations in terms of C/I ratios, it is necessary to determine a downlink carrier strength level on a downlink radio frequency channel assigned to one cell and a downlink interference level caused by another cell having a simultaneous downlink transmission.

Figure 4:
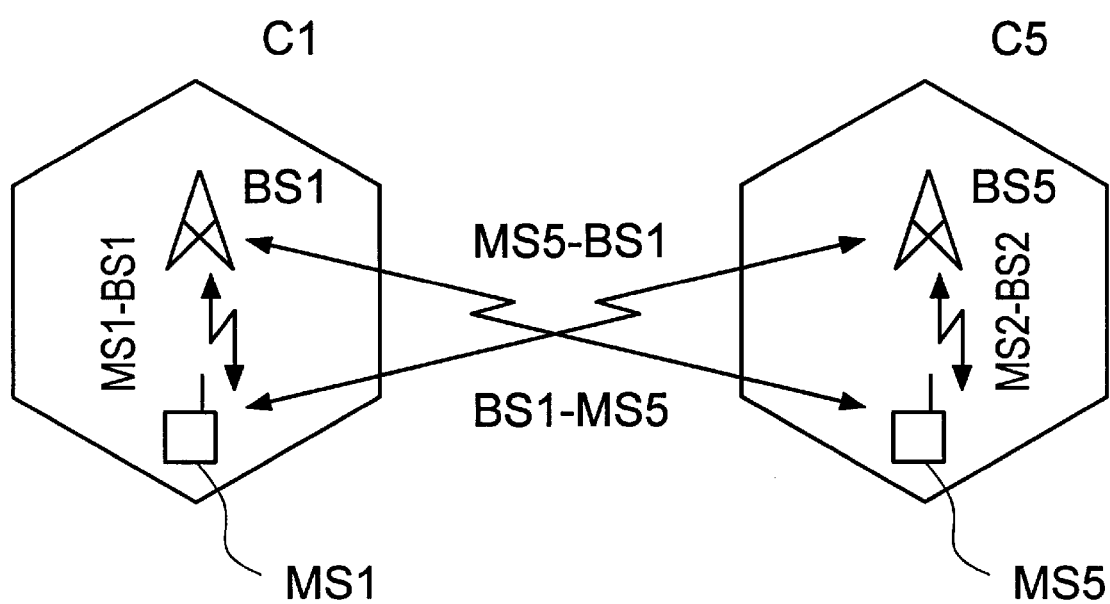
FIG. 4 is a diagram of cell relations between two exemplary cells of the communication system of FIG. 1.

Referring to FIG. 4, exemplary cells C1 and C5 are shown for illustrating the downlink and uplink parameters used in determining C/I ratios. As shown, base stations BS1 and BS5, which serve corresponding cells C1 and C5, communicate with mobile stations MS 1 and MS5, respectively. A carrier signal strength in one cell is a measured signal strength within the same cell, preferably, from a solitary transmitting source, such as a mobile station or a base station. As shown, a two-way MS1-BS1 link represents uplink or downlink carrier signal (C) in cell C1, and another two-way MS5-BS5 link represents uplink or downlink carrier signal (C) in Cell 5. An interference in one cell is a measured received signal strength from a transmission source in another cell. A two-way BS1-MS5 link depicts uplink or downlink interference (I) introduced by transmissions from cell C1 in cell C5, and a two-way MS5-BS1 link depicts uplink or downlink interferences (I) introduced by transmissions from C5 in cell C1 on the same frequency.

Under the accidental and semi accidental approach, uplink cell relations may be expressed in terms of C/I ratios. For each interference measurement (I) form a single source, which is made according to the method of the present invention, one or more carrier signal strength measurements (C) during one or more randomly selected calls may be used to determine a single or several uplink C/I cell relations at the same time. Under the hybrid semi-accidental approach the uplink and downlink cell relations may be expressed in terms of uplink and downlink C/I ratios. With respect to the uplink C/I measurements, the base stations BS1–BS8 collect, accidentally or semi-accidentally, and report uplink measurements of received signal strength from the mobile stations MS1–MS8. For example, BS5 measures signal strength on $f_5$ and scans other uplink frequencies $f_1$–$f_4$ and $f_6$–$f_8$. The signal strength on $f_5$ corresponds to uplink carrier strength (C) in C5, and each one of the other measurements correspond to uplink interference (I) from a corresponding cell, provided that there is a sole transmitter on that frequency. An uplink (C/I) value can thus be calculated for C5 relative to all other cells, with the C/I value so calculated corresponding to a C/I experienced at BS5 if the MS5 and another mobile station, e.g., MS1, were transmitting on the same frequency at the same time. Distributions of calculated uplink values may be derived as described in relation to the path gain values for expressing cell relations in terms of C/I.

With respect to downlink C/I parameters, as described above, the mobile stations MS1–MS8 collect and report downlink measurements of received signal strengths over the radio frequency channel of their own cells and those of other cells in the communication system using the MAHO-list. For example, MS5 measures signal strength on $f_5$ and scan other downlink frequencies $f_1$–$f_4$ and $f_6$–$f_8$. The signal strength on $f_5$ corresponds to downlink carrier strength (C) in C5, and each one of the other measurements correspond to downlink interference (I) from a corresponding cell, provided that there is a sole transmitter on that frequency. The mobile stations report the measured downlink carrier signal strength (C) and the downlink interference (I) measured at the same time as (C). A downlink (C/I) value can thus be calculated for C5 relative to all other cells that corresponds to a C/I experienced at MS5 it BS5 and another base station, e.g., BS1, were transmitting on the same frequency at the same time. Again, distributions of calculated downlink C/I values may be derived for expressing cell relations in terms of C/I.

It is to be understood that the description provides exemplary embodiments of the invention and that it can undergo many modifications without departing from the spirit and scope of the invention, as defined by the following claims.

What is claimed is:

1. A method for determining cell relations between a plurality of cells in a cellular communication system comprising the steps of:

transmitting signals from one or more transmitters over a plurality of radio frequency channels assigned to the cells;

receiving the transmitted signals over the plurality of radio frequency channels;

measuring received signal strengths at corresponding measurement times;

processing received signal strength measurements and corresponding measurement times to determine whether a measured received signal strength at a corresponding measurement time is based on transmission from a single transmitter in a cell; and determining cell relation values between the cells based on received signal strength measurements that are determined to be for transmissions from single transmitters.

2. The method of claim 1, wherein the determination of whether a measured received signal strength at a corresponding measurement time is from a single transmitter is based on a record of on going calls within the communication system.

3. The method of claim 1, wherein the signal strength measurements are made by scanning the plurality of radio frequency channels at a predetermined rate.

4. The method of claim 1, wherein the received signal strength measurements correspond to uplink received signal strength measurements.

5. The method of claim 4, wherein the one or more receivers are one or more base stations each having a call allocation list prioritizing a number of radio frequency channels allocatable to calls within corresponding cells, wherein the call allocation lists in one base station is arranged relative to call allocation lists in other base stations to increase the probability of measuring received signal strength from single transmitters.

6. The method of claim 5, wherein the call allocation list in one base station prioritizes the radio frequency channels allocatable to calls in a reverse order relative to prioritization of the radio frequency channels allocatable to calls at the other base stations.

7. The method of claim 1, wherein the received signal strength measurements correspond to downlink received signal strength measurements.

8. The method of claim 7, wherein the downlink received signal strength measurements correspond to measurement of "dummy signals."

9. The method of claim 7, wherein the one or more receivers are one or more mobile stations that incorporate a list prioritizing signal strength measurements over the plurality of radio frequency channels, wherein the lists incorporated in at least one mobile station is arranged to increase the probability of signal strength measurements from single transmitters.

10. The method of claim 9, wherein the list of the plurality of radio frequency channels used for received signal strength measurements is included as a part of MAHO lists transmitted to the one or more mobile stations at the beginning of a call.

11. The method of claim 10, wherein the lists of the plurality of radio frequency channels included as a part of the MAHO lists correspond to lists of radio frequency channels maintained in a plurality of base stations for increasing the probability of signal strength measurements from single transmitters.

12. The method of claim 1, wherein the cell relation values are expressed in terms of path gain values.

13. The method of claim 12, wherein the path gain values are determined based on time stamped transmit power reports of the transmitter by time correlating the transmit power report with received signal strength measurements.

14. The method of claim 13, wherein the transmit power reports relate to the power output of one or more base stations.

15. The method of claim 13, wherein the transmit power reports relate to the power output of one or more mobile stations.

16. The method of claim 1, wherein the cell relation values are expressed in terms of C/I ratios with each C/I ratio being derived based on a carrier strength measurement (C) and an interference measurement (I).

17. The method of claim 16, wherein the carrier signal strength measurement (C) corresponds to a received signal strength measurement made during at least one randomly selected call within a cell, and the interference measurement corresponds to a received signal strength measurement from a single transmitter in another cell.

18. The method of claim 16, wherein the cell relation values are expressed in terms of uplink and downlink C/I ratios, with each C/I ratio being derived based on a carrier signal strength measurement (C) and an interference measurement (I).

19. The method of claim 18, wherein the uplink C/I ratios are derived based on time correlated uplink carrier signal strength measurements and uplink interference measurement at a base station, and wherein the downlink C/I ratios are derived based on time correlated downlink carrier signal strength measurements and down link interference measurement at a mobile station.

20. The method of claim 1, wherein the cell relation values are expressed in terms of PathgainC/PathgainI ratios.

* * * * *